United States Patent [19]
Lapucci

[11] Patent Number: 5,192,982
[45] Date of Patent: Mar. 9, 1993

[54] CODED-FRINGE INTERFEROMETRIC METHOD AND DEVICE FOR WAVEFRONT DETECTION IN OPTICS

[75] Inventor: Antonio Lapucci, Florence, Italy

[73] Assignee: Office Galileo S.P.A., Florence, Italy

[21] Appl. No.: 684,690

[22] Filed: Apr. 11, 1991

[30] Foreign Application Priority Data

Apr. 13, 1990 [IT] Italy ................... 9367 A/90

[51] Int. Cl.⁵ .............................. G01B 9/02
[52] U.S. Cl. ................... 356/345; 356/359; 356/360
[58] Field of Search ............... 356/359, 360, 349, 346, 356/345

[56] References Cited

U.S. PATENT DOCUMENTS 3,857,636 12/1974 Angelbeck .................... 356/349

Primary Examiner—Samuel A. Turner
Attorney, Agent, or Firm—McGlew and Tuttle

[57] ABSTRACT

For the detection of the wavefront of a beam, based on a Mach-Zehnder interferometric configuration, synchronous detection - which replaces a temporal scan or a spatial dimension of the array of sensors - is obtained by means of frequency coding of the fringes present in the function I(x,y).

17 Claims, 3 Drawing Sheets

CODED-FRINGE INTERFEROMETRIC METHOD AND DEVICE FOR WAVEFRONT DETECTION IN OPTICS

FIELD OF THE INVENTION

The invention relates to a method and an apparatus for wavefront detection in particular in the field of adaptive optics.

SUMMARY AND OBJECTS OF THE INVENTION

A first subject of the invention is a method of detection of the wavefront of a beam, based on a Mach-Zehnder interferometric configuration, according to which, essentially, synchronous detection—which replaces a temporal scan or a spatial dimension of the array of sensors—is obtained by means of frequency coding of the fringes present in the function I(x,y).

In a practical implementation, a signal is acquired by means of a section, parallel to the X axis, of the fringe system under examination, and the low-frequency signal centered around a spatial carrier frequency $f_o$ is processed, with reconstruction of the phase of the field in known manner using Fourier analysis techniques, and thus the wavefront on the Y (constant) section under analysis.

Advantageously, coding is carried out, in the spatial frequency of the fringes, of the phase information relative to different slices of the transverse profile of the beam under examination, with the use of optical systems which make it possible to construct a different carrier $f_y$ for each y in which sampling of the beam is carried out, with a different tilt (misalignment) contribution at the different ordinates, between the beam under examination and a reference beam in the interferometer, the signal from all the sections with y constant being detected using a single sensor.

It is possible to envisage the use of a single linear array parallel to the x axis, or the use of a single detector and a single scan in the x direction.

In a possible solution, it is possible to contemplate spatial filtering of the beam under examination, in order to reduce the aberrations detected at the correctable spatial frequencies.

A pin-hole arrangement can be adopted in order to avoid superpositions of the bands of the signals and thus increase the clearness of the signals detected.

Another subject of the invention is an apparatus, that is to say a device for implementing the method of wavefront detection indicated above, with the use of a Mach-Zehnder interferometer. The device forming the subject comprises essentially means for frequency coding as wavefront sensor.

In a possible embodiment, the device can comprise in combination a beam-splitter for generating from the beam under examination two distinct paths, a spatial filter on one path for generating a plane reference, a spatial filter on the other path for limiting the band of the aberration distribution, and a highly astigmatic component for introducing a "carrier" interference figure, mirrors on the two paths and an oscillating mirror on one path which is recombined by a beam-splitter, a screen with a series of pin-holes aligned orthogonally to the direction of scanning of the oscillating mirror, for providing the information, with sampling of the fringe pattern at different ordinates and with frequency centering.

According to another possible embodiment, the device, in particular for I.R. applications, can comprise in combination a beam-splitter for generating from the beam under examination two distinct paths, a spatial filter on one path for generating a reference beam, a spatial filter on the other path for limiting the band of the aberration distribution, mirrors on the two paths and an oscillating mirror on the path which is recombined by a beam-splitter, on which the two beams interfere with an angle between the two directions of propagation which increases linearly with the y ordinate, a screen with a series of pin-holes aligned orthogonally to the scanning of the oscillating mirror, for providing the information by means of a lens to a single detector, as the mirror carries out the scanning.

For the frequency coding, it is possible to adopt means for linear variation of the tilt between the two beams in the interferometer. It is possible to provide segmented or cylindrical mirrors, or reflection gratings in which the interval varies linearly in the direction parallel to the ruling, continuously or discontinuously.

For the frequency coding, it is possible to adopt an astigmatic optical component.

The invention will now be described in greater detail with reference to the attached drawings and with non-limitative examples of the invention itself.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BACKGROUND OF THE INVENTION

Figure 1:
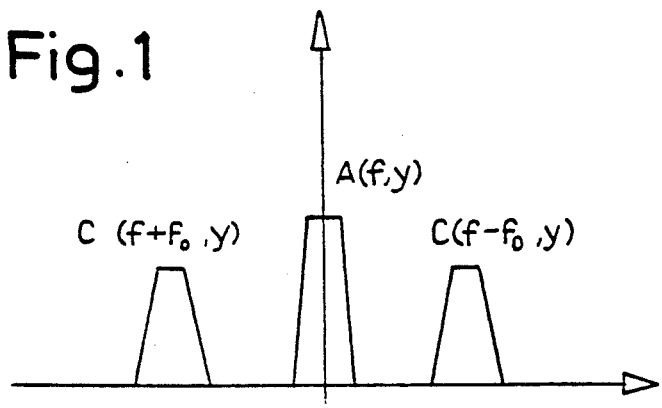
FIG. 1 shows symbolically a spectrum relative to one slice of the fringe system.

This invention falls within the field of wavefront detectors and in particular of sensors for Adaptive Optics dedicated to the control of power laser beams, known as C.O.A.T. (Coherent Optical Adaptive Techniques).

See for example: J. E. Pearson, R. H. Freemann, H. C. Reynolds, "Adaptive techniques for wave-front correction" in Applied Optics and Optical Engineering vol. VII—Academic Press (1979); J. C. Wyant, C. L. Koliopoulis, "Phase measurements for Adaptive Optics" Univ. Arizona, Tucson, in AGARD conference proc. 300 (1981).

A beam of light can be considerably distorted when it passes through the atmosphere or other means of transmission and this type of problem has, among other things, limited the resolution of the images received by stellar telescopes based on earth. In the same manner, atmospheric distortion has imposed limits on the attempts to irradiate objects with laser beams when these objects are located at a great distance from the laser which is transmitting. Other distortions due to the presence of optical systems or to the intrinsic instabilities and multimodal transmissions of the laser source, which are in particular present in power applications, can join in degrading the quality of the beam, causing a loss of performance of the system.

Different systems of wavefront correction have been conceived in order to overcome these distortions. The critical part of these systems is without doubt the wavefront sensor. In general, it can be said that the L principal objective of wavefront sensors is that of measuring the spatial distribution of the deformations of the front, for example in the form of deviations of the front from a reference surface such as a plane or a sphere. The deformation of the wavefront can be expressed in terms of the wavelength as the optical path difference (O.P.D.).

Systems for controlling the quality of the beam which have been tested to date, such as described for example in U.S. Pat. No. 3,923,400, Hardy, December, 1975, are based on wavefront sensors of geometric or interferometric type which measure the phase of the field in the different zones of the wavefront and produce a set of signals which are proportional to the corrections to be carried out to the beam. These signals are sent to a phase corrector, on which the beam is incident, in order to change the relative phase in the different zones of the front. The active optical component capable of correcting the beam can be produced using a deformable or segmented mirror which can be modified selectively by means of a series of piezoelectric actuators or, in the case of radiation in the visible field, by a spatial light modulator such as a liquid crystal array. Analysis of the wavefront with a geometric technique is based on detection of the position of paraxial focuses obtained by sectioning the beam transversely into a great number of distinct components. This method, which is known by the name "Hartmann test", has been used in the past in adaptive systems for astronomy also, but its production is made particularly critical by the necessity of having available a large number of lenses on the same plane and four position sensors for each lens, as well as by the necessity of maintaining all these components aligned with great stability.

Interferometric analysis, on the other hand, is based on the now classic technique of making two beams interfere for the purpose of converting the unobservable phase variations of the electromagnetic field into observable measurements of changes in intensity, generally known as "fringe systems". In formulae, let $E_1$ be the field of which it is desirable to measure the wavefront and $E_2$ a reference plane field:

$$E_1 \xi_1(x,y) \, e^{i(kz-\omega t+\phi_0+\Delta\phi(x,y))} \quad (1)$$

$$E_2 = \xi_2(x,y) \, e^{i(kz-\omega t+\phi_0)} \quad (2)$$

with conventional notation.

The interference of these two fields gives rise to a distribution of intensity or fringe system of the type:

$$I_{int}(x,y) = |E_1 + E_2|^2 = |E_1|^2 + |E_2|^2 + 2\,Re[E_1\,E_2^*] = \quad (3)$$

$$\xi_1^2(x,y) + \xi_2^2(x,y) + \xi_1(x,y)\,\xi_2(x,y)\cos[\Delta\phi(x,y)]$$

$$\Delta\phi(x,y) = \frac{2\pi}{\lambda}\,O.P.D.(x,y) \quad (4)$$

in which O.P.D.(x,y) is the quantity to be measured.

It is also possible to distinguish two categories among wavefront detection systems: 1) systems which measure the optical path difference directly and 2) those which measure it indirectly. The indirect method is generally based on measurement of the inclination of the wavefront and from this works back to the O.P.D. distribution. The inclination error of the wavefront is the result of geometric techniques such as those based on the Hartmann sensor or of interferometric methods of the radial shear or lateral shear type. Examples of these approaches are explained for example in U.S. Pat. No. 4,141,652, Feineleib, February, 1979, U.S. Pat. No. 4,518,854, Hutchin, May, 1985 and U.S. Pat. No. 4,575,248, Horwitz-MacGovern, March, 1986.

The indirect methods require calculations for converting inclination data into O.P.D. data. These calculations can be made in real time or off-line and with dedicated circuitry or via software. Direct measurements of the O.P.D. in relation to a reference surface (such as a plane) are more frequently carried out with interferometric techniques. Examples of detectors of this type include conventional interferometric configurations of the Mach-Zehnder, or Twymann-Green type such as in the work of Massie and Massie-Holly, see U.S. Pat. No. 4,346,999, Massie, August, 1982; U.S. Pat. No. 4,188,122, Massie-Holly, February, 1980, in which techniques of digital interferometry are used in order to improve the accuracy of measurement.

DESCRIPTION OF THE INVENTION

The invention consists in a method of reconstruction of the wavefront of a beam, based on a modified Mach-Zehnder interferometric configuration (consult J. C. Wyant, "Optical testing and testing instrumentations", Lecture notes, Optical Science Center, Univ. Arizona, Tucson, and P. Hariharan, "Interferometric metrology: current trend and future prospects", Proc. S.P.I.E. vol. 816, 2, (1987)).

It has already been mentioned that the quantity to be measured (O.P.D.(x,y)) can be obtained in an interferometric technique from an intensity distribution I(x,y). To this end, the carrying out of the measurement is based on the detection of this intensity as a function of position and in general requires the availability of an array of NxM detectors so as to sample the function I(x,y) in:

$$I_{nm} = I(x_n, y_m) \, 0 < n < N, \, 0 < m < M$$

Alternatively, it is possible to replace one dimension of the array by a temporal scan:

$I_{nm} = I(x_n, mv_y\tau_y)$ (single scan, linear array)

$I_{nm} = I(nv_x\tau_x, mv_y\tau_y)$ (double scan)

The double scanning technique is entirely similar to that carried out in a television picture tube and is often carried out in infra-red imaging techniques, where the availability of integrated two-dimensional arrays of sensors with certain resolution has not yet been achieved. Although on the one hand scanning techniques make it possible to reduce the number of sensors to be used, on the other they also bring disadvantages such as the introduction of moving components into the optical system and the extension of the times of acquisition of an "image" with the consequent loss of synchrony of the acquisition. In other words, each part of the beam is analyzed at a different time to the others.

This invention introduces a synchronous detection technique which makes possible the replacement of a temporal scan or of a spatial dimension of the array of sensors by frequency coding of the fringes present in the function I(x,y). This result is extremely important for the detection of the wavefront of laser beams in I.R. or in U.V. when integrated planar arrays of detectors are not available or even a linear array proves very expensive and of difficult application.

This technique proves to be particularly suited to the problems inherent in the production of Adaptive Optics for laser beams, in which the spatial resolution to be taken into consideration is rather limited, given the limited number of mobile elements of the active component, and at the same time the speed and the synchrony of the detection is important.

With reference to equations (3) and (4), it can be seen that the information on the deformation of the wavefront (O.P.D.) is contained in a point function of the type:

$$I(x,y) = A(x,y) + B(x,y)\cos\left[\frac{2\pi}{\lambda}(f_o x + O.P.D.(x,y))\right] \quad (5)$$

in which there has been isolated a spatial frequency $f_o$ in the x direction proportional to the sine of the angle of tilt (misalignment) between the two beams which produce interference. Alternatively:

$$I(x,y) = a(x,y) + c(x,y)\exp\left(\frac{2\pi i f_o x}{\lambda}\right) + \quad (6)$$

$$c^*(x,y)\exp\left(-\frac{2\pi i f_o x}{\lambda}\right)$$

$$O.P.D.(x,y) = \text{arctg}\left[\frac{Im[c(x,y)]}{Re[c(x,y)]}\right] \quad (7)$$

The above is illustrated in FIG. 1.

In this manner, the wave aberration of the beam, expressed by O.P.D.(x,y), can be obtained by acquiring a signal obtained by means of a section parallel to the x axis of the fringe system under examination and by processing the low-frequency signal centered around the spatial carrier frequency $f_o$. The spectrum of the signal described in equation (6) is:

$$g(f_x,y) = a(f_x,y) + c^*(f_x - f_o, y) + c(f_x + f_o, y) \quad (8)$$

By isolating from this spectrum only the content around $f_o$, it is possible to reconstruct using a Fourier analysis technique (consult K. H. Womack, "Interferometric phase measurements using spatial synchronous detection" Opt. Eng. 23, 391, (1984), K. H. Womack, "Frequency domain description of interferogram analysis" Opt. Eng. 23, 396, (1984), M. Takeda, H. Ina, S. Kobayashi "Fourier transform method of fringe pattern analysis for computer-based topography and interferometry" J.O.S.A., 72, 156, (1982)) the phase of the field, and therefore the profile of the wavefront, on the section analyzed (y=constant). The process would if necessary be repeated on other sections of the beam. The particular and innovative technique which is instead introduced in this invention consists in coding, in the spatial frequency of the fringes, of the phase information relative to different slices of the transverse profile of the beam under examination. In other words, use is made of optical systems which make it possible to construct a different carrier $f_y$ for each y in which sampling of the beam is carried out. This in general corresponds to having a different tilt contribution at the different ordinates, between the beam under examination and the reference beam in the interferometer. The signal from all the y=const. sections can then be simply detected by means of a single sensor. The result is thus achieved that it is possible to carry out the detection using a linear array parallel to the x axis or alternatively using a single detector and a single scan always in the x direction.

The signal on the detector will be of the type:

$$I_{out} = \Sigma_i I_i(x,y) = \quad (9)$$

$$\Sigma_i A(x,y_i) + B(x,y_i)\cos\left(\frac{2\pi}{\lambda}(f_i x + O.P.D.(x,y_i))\right)$$

Figure 2:
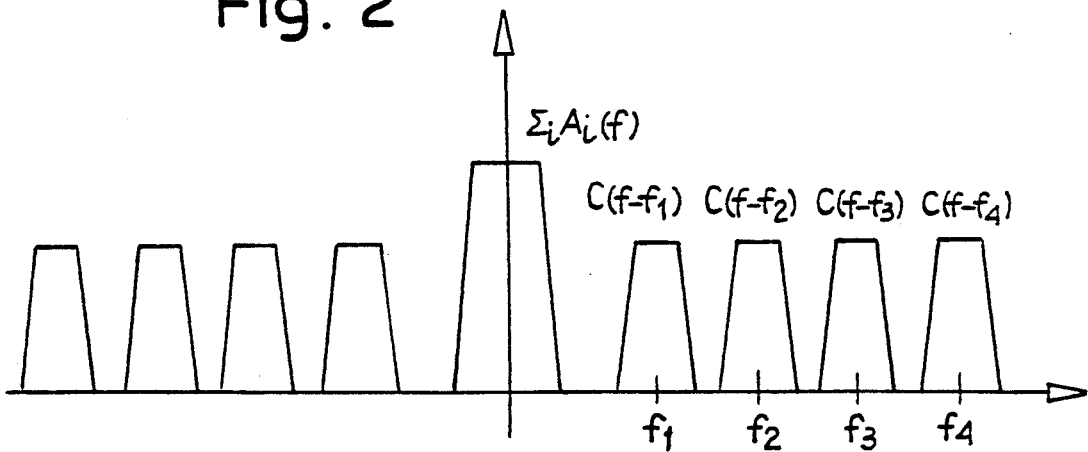
FIG. 2 shows symbolically a spectrum relative to the sum on the detector of the coded signals obtained from the different slices.

Correspondingly, there is a spectrum of the type represented in FIG. 2 and from which it is possible to extract the information on the O.P.D. at all the (x,y) points, assuming only that the separation between the carrier frequencies is greater than the band width of the aberration function (O.P.D.). The band which can be used for the carrier frequencies is limited by the spatial resolution of the detection system, or by the aperture of the detector. An increase in resolution of the detection system can be pursued by means of smaller pin-holes to the disadvantage of the sensitivity of the system. In practice, it is possible to observe higher spatial frequencies every time that the power of the beam which is incident on the interferometer is sufficiently high. As far as the band narrowness of the aberration function is concerned, it is possible to envisage introducing into the interferometer spatial filtering on the beam under examination, in order to reduce the aberrations detected at the spatial frequencies which are effectively correctable by the active part of the system.

With this technique, it is possible to produce a wavefront sensor by means of a single detector and a single scan, the maximum acquisition speed of which is limited only by the electronics downstream of the sensor. In practice, this leads to the possibility being provided of effecting corrections at a frequency of 1 kHz at 100 points of the beam, having available an analog/digital converter with a rate of 1 Msample/sec downstream of the detector.

DETAILED DESCRIPTION OF THE DIAGRAMS

Figure 3:
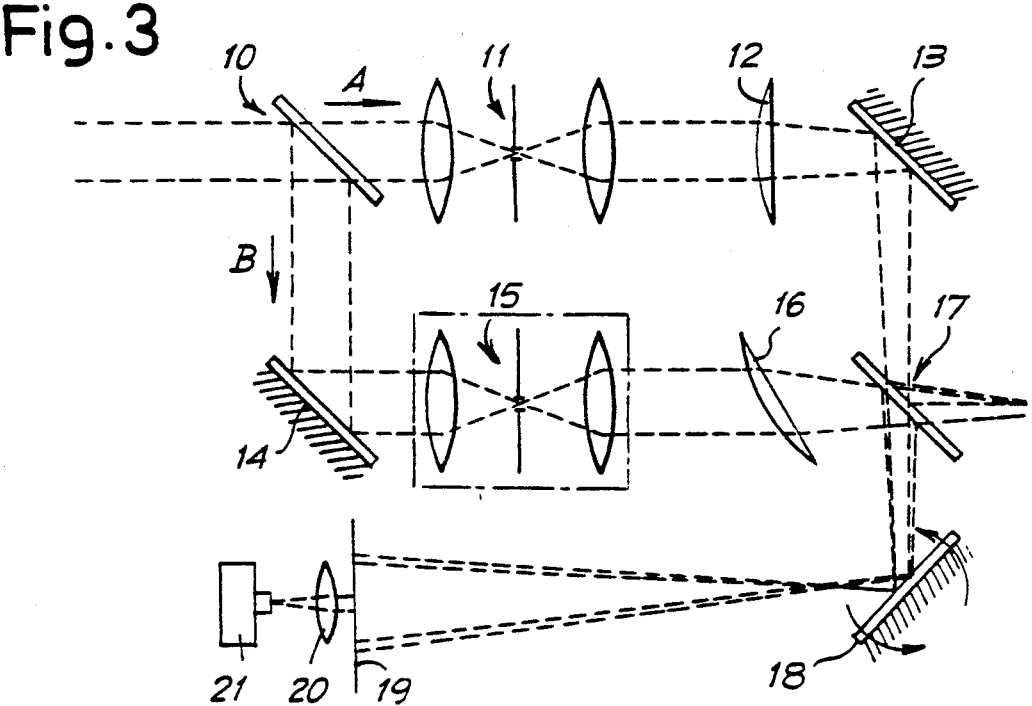
FIG. 3 shows a modified Mach-Zehnder interferometer with frequency coding by means of an astigmatic optical component.

In FIG. 3, a first diagram is reproduced of a modified Mach-Zehnder interferometer which makes possible frequency coding of the phase information along the y axis.

Figure 4:
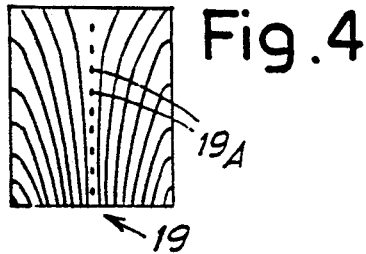
FIG. 4 shows an image on the screen of the apparatus in FIG. 3.

The beam under examination is separated by the beam-splitter 10 and is propagated along two distinct paths A and B which comprise the mirrors 13 and 14. In path A, the beam is filtered by a spatial filter 11 in order to generate a plane reference which is then converted to spherical by a positive lens 12. In path B, the beam keeps the information on aberration of the wavefront, passing if necessary through a spatial filter 15 which has the purpose of limiting the band of the aberration distribution (O.P.D.). It is then made to pass through a highly astigmatic component, such as an off-axis planoconvex lens 16 or a cylindrical lens. The two beams A and B are recombined in a beam-splitter 17. The astigmatism introduces a "carrier" interference figure which is illustrated on the projection S of the screen 19 shown in FIG. 4. This figure, which is due to the saddle shape of a wavefront affected by pure astigmatism, causes the information sampled at different ordinates to be centered in frequency around a different carrier. The information along the x axis is obtained by means of an optical scan by rotating the mirror 18 about an axis orthogonal to the plane of the drawing. The screen 19 contains a series of pin-holes (19A) which are aligned in the y direction and which carry out the sampling of the fringe figure. The lens 20 collects all the information on the single photodetector 21.

Figure 5:
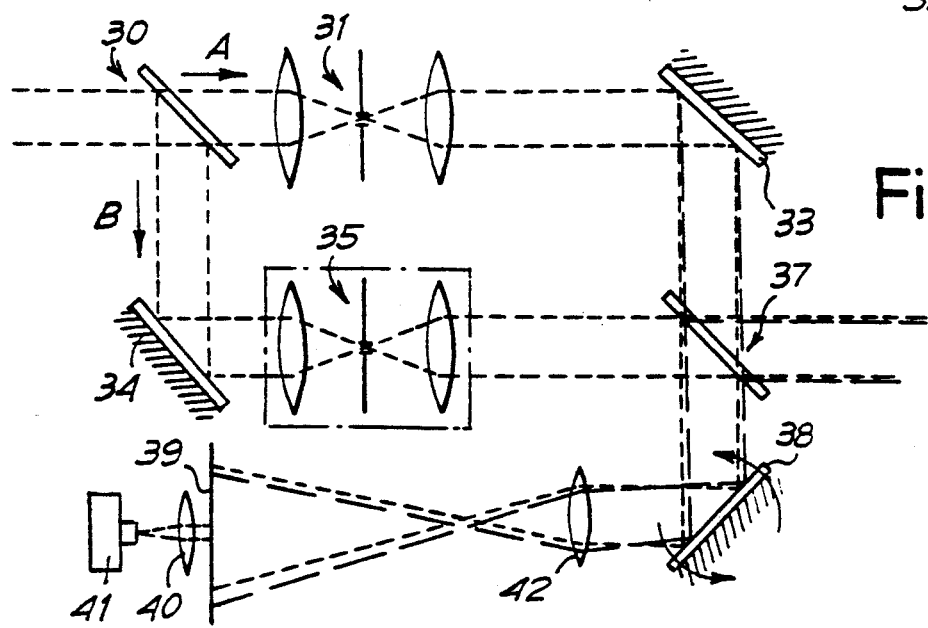
FIG. 5 shows a modified Mach-Zehnder interferometer with frequency coding obtained by means of linear variation of the tilt between the two beams in the interferometer.

In FIG. 5, an alternative technique is illustrated for frequency coding of the information along the axis of the ordinates. The interferometric diagram is again of the modified Mach-Zehnder type, with beam-splitter 30, propagation along A and B, spatial filter 31, mirrors 33 and 34, spatial filter 35, beam-splitter 37.

In this technique, each or at least one of the mirrors 33 and 34 is segmented in strips parallel to the x axis (in the plane of the drawing) and the two mirrors are mounted so as to make the two beams interfere on the beam-splitter 37 with an angle between the two directions of propagation which increases linearly with the y ordinate of each segment of the mirrors 33 and 34 or of at least one of them. The beam in path A again represents the reference, being rendered plane by the spatial filter 31; the beam in path B on the other hand carries the aberration information (O.P.D.), if necessary limited in band by the spatial filter 35. Downstream of the oscillating mirror 38, a screen 39 once again contains the sampling pin-holes and the lens 40 collects all the information on the single detector 41 as the mirror 38 carries out the scanning along x of the transverse section of the beam. The lens 42, which is optional, has the function of enlarging the interference figure.

Figure 6:
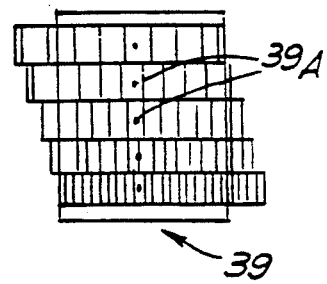
FIG. 6 shows an image on the screen of the apparatus in FIG. 5.

The components 33 and 34 can be made, as an alternative to the segmented mirrors, with reflection gratings, the interval of which is varied linearly in a direction parallel to the ruling, if necessary discontinuously also. Clearly, the blazing of the grating is to be such that it optimizes the output power to the first order of diffraction. This solution can lead to a considerable simplification of the system as the number of components to be aligned and kept stable in the interferometer is drastically reduced. It is evident then that the solution in FIG. 6 is necessary for applications in I.R., and particularly in the 10 $\mu$m spectral band, because at this wavelength the optical path difference necessary to separate sufficiently the carriers cannot be carried out with the aberration of a single component such as an astigmatic lens.

Figure 7:
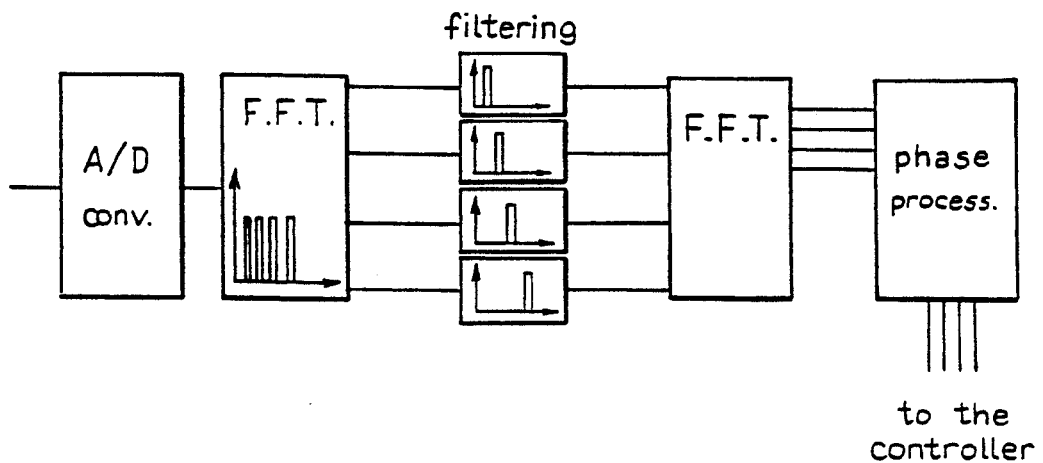
FIG. 7 is a block diagram of the processing of the signal detected by the wavefront sensor.

In FIG. 7, a block diagram is reproduced, which represents the processing operations to be carried out on the signal, which can be implemented via software after an analog/digital conversion, in order to generate the error signals to be sent to the active component of the Adaptive Optics.

Figure 8:
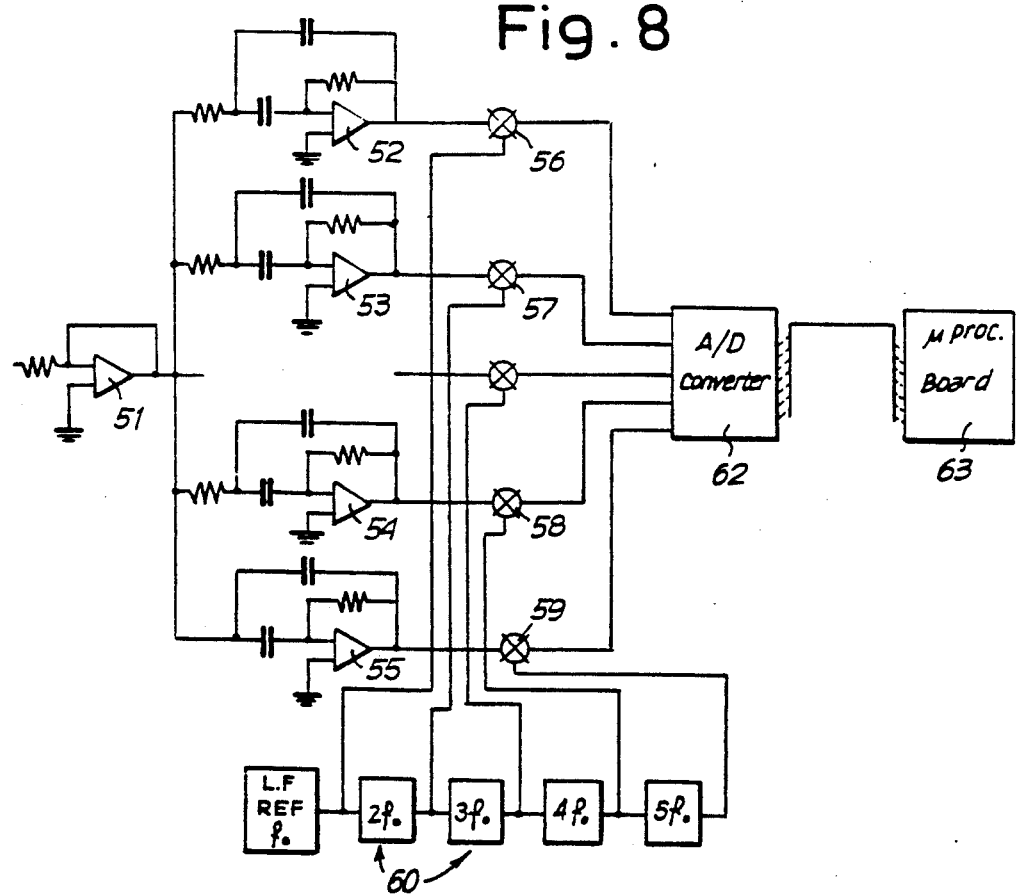
FIG. 8 shows a tentative outline of the dedicated electronics for rapid processing of the signal from the wavefront detector.

In FIG. 8, a tentative outline is reproduced for producing dedicated analog circuitry so as to make processing faster. The operational device 51 is a buffer (decoupler) which has the function of decoupling the detector from the electronics downstream. The operational devices 52, 53, 54 and 55 have the function of active band-pass filters in order to generate signals to be mixed in 56, 57, 58 and 59 with the low reference frequencies $f_o$, $2f_o$, $3f_o$ etc., which are generated by the chain 60 of synchronized clocks, in order to shift the signal of each window around the continuous frequency. The (multiplexer-equipped) analog/digital converter 62, which has a number of channels, takes into 63, for digital processing, the signals which have already been decoded and which can then be sampled at lower frequency. The deformable mirror is controlled from the digital card by means of a D./A. conversion.

I claim:

1. A method for detection of a wavefront of a beam, the method comprising the steps of:
   providing a Mach-Zehnder interferometric configuration;
   constructing a different spacial carrier frequency for each y value in an intensity function I(x,y);
   frequency coding phase information of a plurality of transverse profiles in said spacial carrier frequency of fringes present in said intensity function I(x,y);
   acquiring a signal representing a section of said intensity function I(x,y) parallel to an x axis; and
   processing a low frequency portion of said signal, said low frequency portion being centered around a spacial carrier frequency, said processing using Fourier analysis techniques in order to reconstruct a phase of the beam and thus detect the wavefront of the beam.

2. A method in accordance with claim 1, further comprising:
   providing different misalignment contributions at different ordinates between the beam and a reference beam in said Mach-Zehnder interferometric configuration;
   providing a single sensor for said acquiring of said signal representing said section parallel to said x axis of said intensity function I(x,y).

3. A method in accordance with claim 1, wherein:
   a linear array of sensors parallel to said x axis is used in said acquiring of said signal.

4. A method in accordance with claim 1, wherein:
   a single sensor scans parallel to said x axis for said acquiring of said signal.

5. A method in accordance with claim 1, further comprising:
   spatially filtering the beam in order to reduce a bandwidth of an aberration function in said Mach-Zehnder interferometric configuration, said bandwidth being reduced to spacial frequency's useful in said reconstruction of said phase of the beam.

6. A method in accordance with claim 1, wherein:
   providing a pin-hole arrangement in said Mach-Zehnder interferometric configuration for avoiding superposition of bands of signal components corresponding to different wavefront sections, said pin-hole arrangement removing ailiasing of the phase information relative to different wavefront slices.

7. A device for detection of a wavefront of a beam, the device comprising:
- a Mach-Zehnder interferometric configuration;
- means for constructing a different spacial carrier frequency for each y value in an intensity function I(x,y);
- means for frequency coding phase information of a plurality of transverse profiles in said spacial carrier frequency of fringes present in said intensity function I(x,y);
- sensor means for acquiring a section of said intensity function I(x,y) parallel to an x axis; and
- processing means for processing a low frequency portion of said signal, said low frequency portion being centered around a spacial carrier frequency, said processing means using Fourier analysis techniques in order to reconstruct a phase of the beam and thus detect the wavefront of the beam.

8. A device in accordance with claim 7, wherein: said Mach-Zehnder interferometric configuration has a first beam-splitter means for splitting the beam into a first path and a second path, a first spacial filter means in said first path for generating a plane reference, a second spacial filter means in said second path for limiting a band of aberration distribution, an astigmatic means for introducing a carrier interference figure, a second beam-splitter means for recombining said first and second paths, a screen with a series of substantially aligned pin-holes, oscillating mirror means for scanning across said substantially aligned pin-holes; and
said processing means samples said fringe figure at different ordinates and with frequency centering to provide the detection of the wavefront.

9. A device in accordance with claim 7, wherein: said Mach-Zehnder interferometric configuration has a first beam-splitter means for splitting the beam into a first path and a second path, a first spacial filter means in said first path for generating a plane reference, a second spacial filter means in said second path for limiting a band of aberration distribution, a second beam-splitter means for recombining said first and second paths, first and second fixed mirror means in said first and second paths respectively, said first and second fixed mirror means for directing said first path and said second path respectively, to interfere on said second beam-splitter at an angle between two directions of propagation which increases linearly with a y ordinate, oscillating mirror means for scanning said recombined first and second paths, and screen means for providing an optical signal to a signal detector by a lens as said oscillating mirror performs said scanning.

10. A device in accordance with claim 7, wherein: said Mach-Zehnder interferometric configuration has tilt means for linear variation of tilt between two beams in said Mach-Zehnder interferometric configuration.

11. A device in accordance with claim 9, wherein: one of said first and said second fixed mirror means is a segmented mirror.

12. A device in accordance with claim 9, wherein: one of said first and said second fixed mirror means is a cylindrical mirror.

13. A device in accordance with claim 9, wherein: one of said first and second mirror means is a reflection grating having groove intervals varying linearly in a direction parallel to a ruling.

14. A device in accordance with claim 13, wherein: said linearly varying is continuous.

15. A device in accordance with claim 13, wherein: said linearly varying is discontinuous.

16. A device in accordance with claim 10, wherein: said frequency coding means has an astigmatic optical component.

17. A method for detection of a wavefront of a beam, the method comprising the steps of:
- providing a Mach-Zehnder interferometric configuration;
- providing different misalignment contributions at different ordinates between the beam and a reference beam in said Mach-Zehnder interferometric configuration;
- constructing a different spacial carrier frequency for each y value in an intensity function I(x,y);
- frequency coding phase information of a plurality of transverse profiles in said spacial carrier frequency of fringes present in said intensity function I(x,y);
- acquiring a signal representing a section parallel to an x axis of said intensity function I(w,y) with a single sensor; and
- processing a low frequency portion of said signal, said low frequency portion being centered around a spacial carrier frequency, said processing using Fourier analysis techniques in order to reconstruct a phase of the beam and thus detect the wavefront of the beam.

* * * * *